Aug. 24, 1926.

H. E. MARTZ

TESTING INSULATOR 1,597,610

Filed April 12, 1923   2 Sheets-Sheet 1

H. E. Martz.
INVENTOR

BY *Victor J. Evans*
ATTORNEY

WITNESSES

Aug. 24, 1926.
H. E. MARTZ
TESTING INSULATOR
Filed April 12, 1923  2 Sheets-Sheet 2
1,597,610
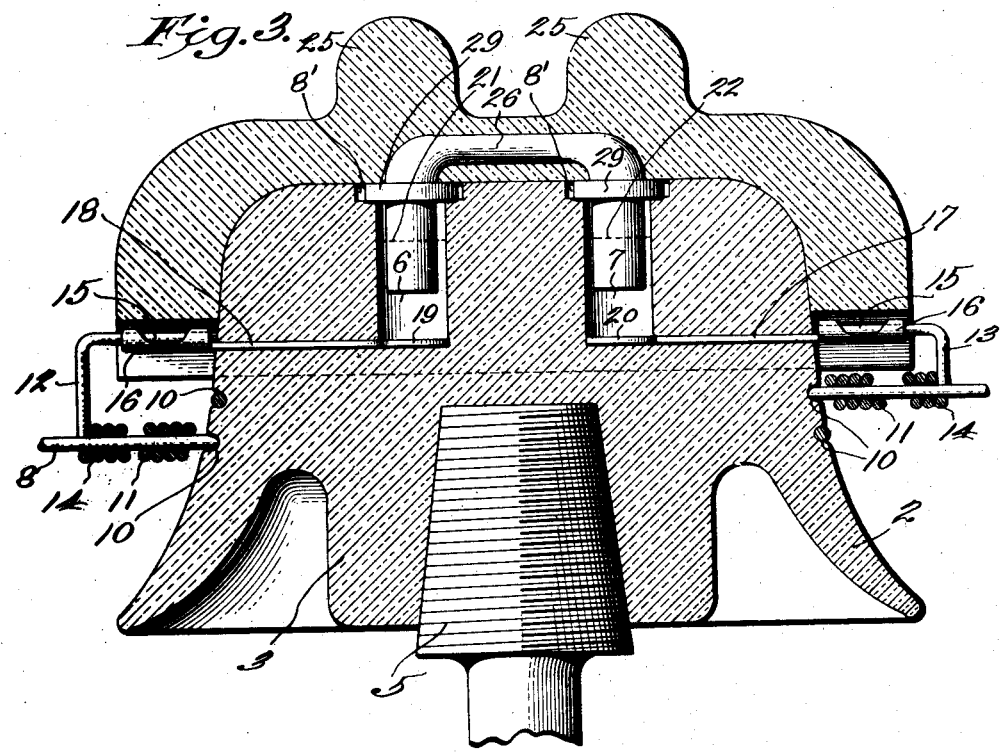
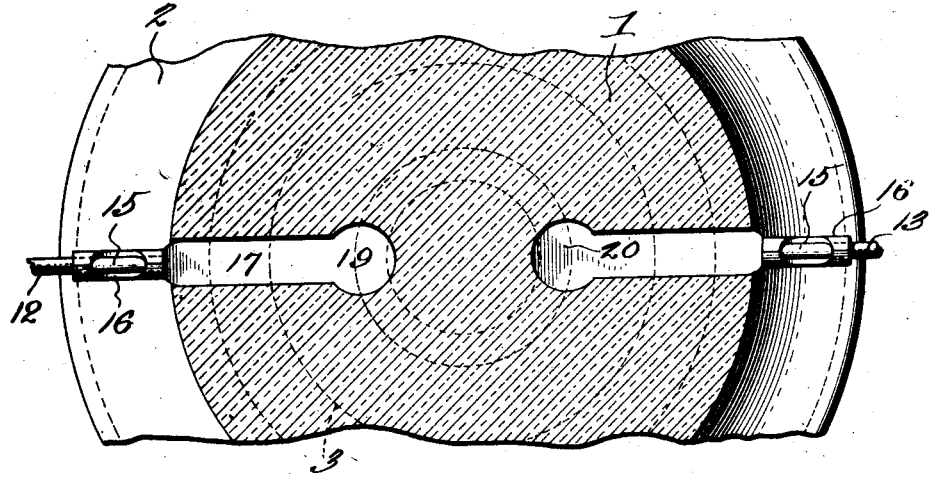
H. E. Martz, INVENTOR Patented Aug. 24, 1926.

1,597,610

UNITED STATES PATENT OFFICE.

HARRY E. MARTZ, OF ATLANTA, GEORGIA.

TESTING INSULATOR.

Application filed April 12, 1923. Serial No. 631,660.

This invention has reference to insulators of the class for supporting telegraph or telephone wires on poles, and has for its primary object to produce a device of this character designed especially for use on long distance open wire conductors which permits of a lineman testing the wires to facilitate the location of trouble in the line.

The invention further resides in other features of construction and in the combination and operative arrangement of elements to be hereinafter fully described, illustrated in the accompanying drawings and specifically pointed out in the appended claim.

In describing the invention in detail, reference is to be had to the accompanying drawings wherein like characters denote like or corresponding parts throughout the several views and in which:—

Figure 3 is a view substantially similar to Figure 2, but showing the top or cover removed to permit the testing of the circuit.

Figure 4 is a perspective view of the body of the improvement.

Figure 1:
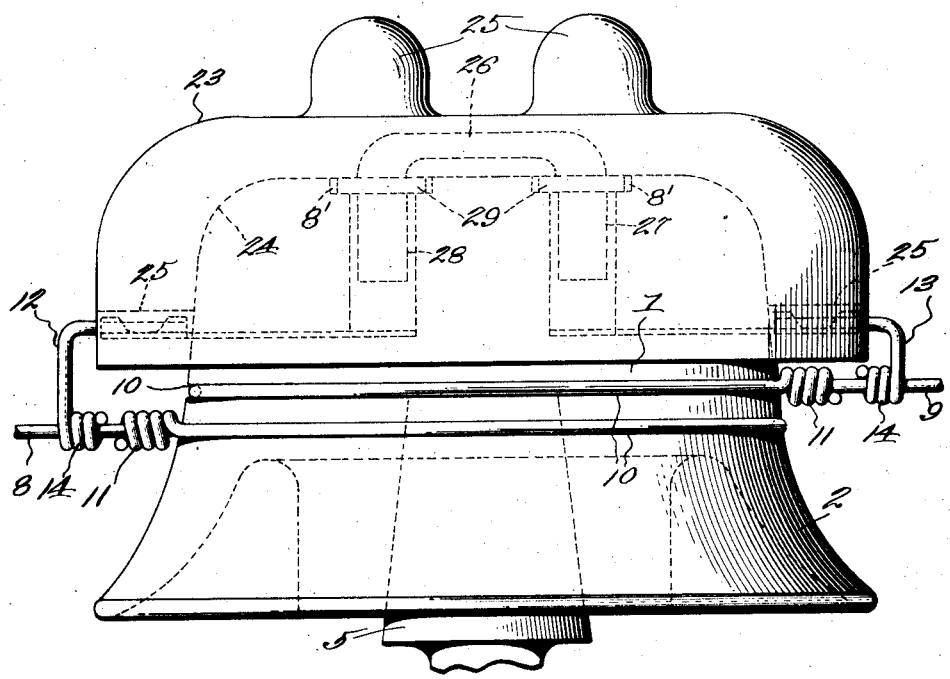
Figure 1 is a side elevation of the improvement.
Figure 2:
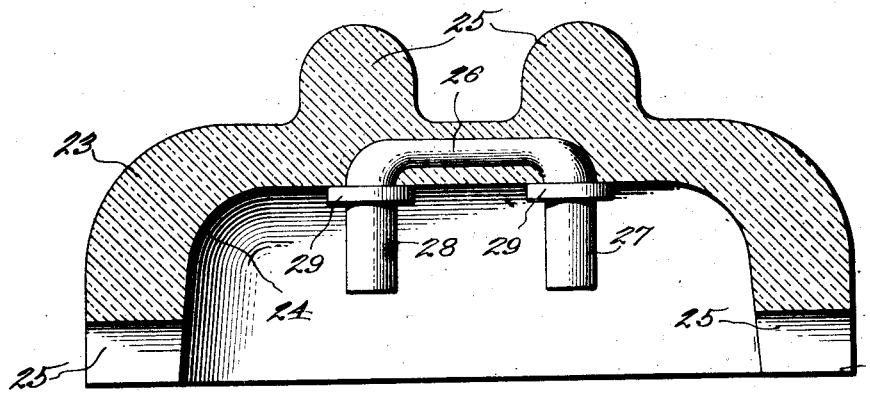
Figure 2 is an approximately central vertical longitudinal sectional view therethrough.

In long distance open wire routes of telephones and telegraphs, trouble not infrequently occurs in the system, and frequent tests are made, especially at the cable terminal poles where the open wire terminates. Also test points have been established at suitable places on the open wire route such as way stations of railroads where circuits cut through a switch board for the cables that lead from the pole into the telegraph or telephone office. Regardless of this, it quite often happens that a lineman experiences great difficulty in locating the fault and quite frequently measurements are missed by a wide margin so that a great amount of time and trouble is experienced before the fault is located and remedied. Even when the fault is located and remedied in the usual manner, that is by soldering the jumper or bridle wire to the line wire, the joint between these wires is susceptible to breakage by high winds or other weather conditions, and the commercial loss, when important wires are "dead" has been estimated as much as one thousand dollars per hour.

My improved insulator permits of the ready testing of the wires connected therewith so that trouble in a line may be quickly determined and remedied.

My improvement includes a body 1 preferably of glass or other insulating material. The body has a bell-like bottom 2 that provides a water shed. The under face of the body is concaved from the edge thereof providing the same with a central projection 3 in the nature of a lug, the said lug being centrally provided with a threaded frusto-conical opening for the reception of the frusto-conical threaded end of the wooden pin 5 that is attached to one of the cross arms supported from the usual pole. The body, from its bell-shaped lower end 2 is rounded inwardly to its opposite or upper end, its said upper end being flat and being provided at two opposed points with sockets 6 and 7 respectively. The flat top of the body is provided with depressions 8' that surround the sockets 6 and 7.

The line wires 8 and 9 are reversely wound around spaced grooves 10 on the outer face of the body and have their ends secured by twisting the same as at 11, around the wires proper. Bridge wires 12 and 13 have their ends coiled around the wires 8 and 9 to establish an electric connection therewith, as indicated by the numeral 14. The bridge wires 12 and 13 have their free ends connected with copper lugs 15 which enter sockets 16 secured or formed on the outer end of copper conductor plates 17 and 18 respectively, the said plates passing through the body 1 and entering the sockets 6 and 7, and the inner ends of these plates are preferably rounded. The bridge wires have their joints soldered with rosin and no soldering pastes or acids are used on the exposed joints because the same render the wires liable to rust.

Received in the sockets 6 and 7, and resting on the terminals 19 and 20 of the conductor plates 17 and 18 are bodies of mercury, indicated by the numerals 21 and 22 respectively.

The top or cover for the body, indicated by the numeral 23 is preferably formed of glass having its under face concaved, as at 24 to snugly engage the upper rounded outer surface of the body 1, while outward of the concavity the lower edge of the said cover 23 is provided with substantially V-shaped grooves 25 to receive therethrough the joints between the bridge wires and the conductor plates 17 and 18 and thus protect the joints from the elements. On its upper face the top or cover is provided with two spaced projecting lugs 25', and these lugs are employed as hand or finger holds whereby the cover may be readily lifted off of the body. Embedded in the body there is an electric conductor preferably in the nature of a copper rod 26 that has its ends arranged angularly in the same direction to provide plugs 27 and 28, the said plugs preferably being formed, adjacent to their juncture with the rod 26 with shoulders 29, and these shoulders may rest on the walls provided by the depressions 8'. This prevents an undue frictional engagement between the body and cover and insures an easy and free removal of the cover from the body. The plugs 27 and 28 need not contact with the walls of the sockets 6 and 7 and the top 23 is sufficiently weighted to cause the mercury to rise when the weight of the plugs is arranged thereon to contact with the sides as well as the bottom of the plugs.

In making a test it is merely necessary for the lineman to raise the top 23 from the body and to insert the points of his testing instrument into the bodies of mercury in the sockets 6 and 7, and it is thought from the foregoing description that the advantages and novel features of the invention will be readily apparent.

I desire it to be understood that I may make such changes in the construction and arrangement of parts as fall within the scope of what I claim.

Having described the invention, I claim:—

An insulator for the line wires of a telegraph system, including a body of insulating material having its upper corner rounded and its sides flared outwardly from said corner and having spaced peripheral grooves, line wires wound around the body in the said grooves and having their ends wound around the wires proper, said body having spaced sockets entering from the top thereof and having rounded depressions in the said top surrounding the sockets, a bridge wire wound around and secured to each of the line wires, and directed toward the body, copper lugs secured to the ends of the bridge wires, a socket for each lug, a conductor plate connected to each lug, entering the body and having a head portion received in the respective sockets of said body, a cover received over the top of the body and having depressions that receive therein the joint between the line wires and the conductor plates, a substantially U-shaped circuit breaker having its central portion embedded in the cover and having its parallel arms received in the respective sockets, and an electric conductor in each socket between the arms of the circuit breaker and the heads of the conductors, and the arms of the circuit breaker having annular shoulders, which rest on the inner walls of the depressions that surround the sockets and hold the cover from frictional engagement with the body.

In testimony whereof I affix my signature.

HARRY E. MARTZ.